C. MARSH.
NUTCRACKER.
APPLICATION FILED AUG. 28, 1916.
1,219,830.
Patented Mar. 20, 1917.
Fig. 1.
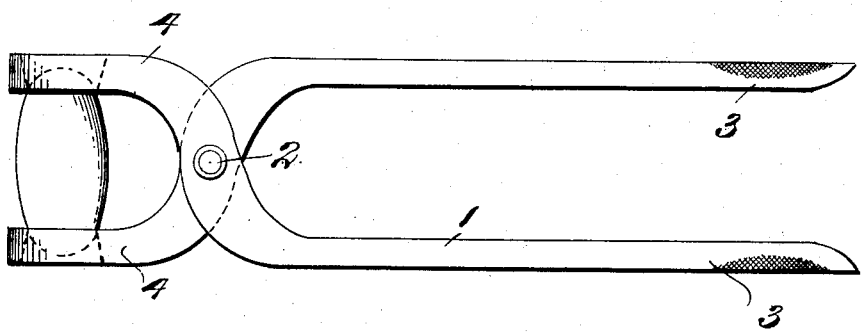
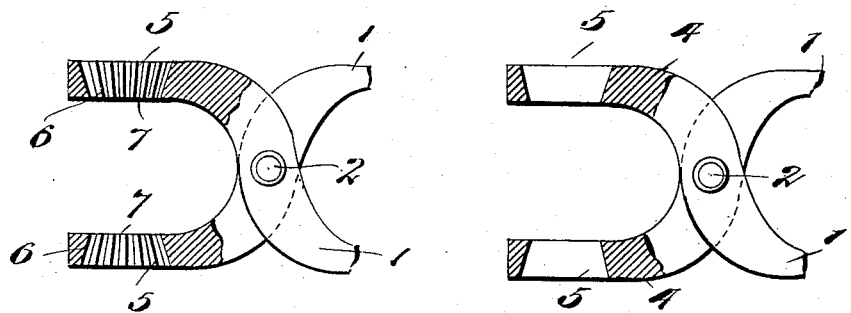
Fig. 2.   Fig. 3.
Inventor:
Cyrus Marsh,
by W. D. Duvall
Attorney.

UNITED STATES PATENT OFFICE.

CYRUS MARSH, OF ASHLAND, VIRGINIA.

NUTCRACKER.

1,219,830.  Specification of Letters Patent.  Patented Mar. 20, 1917.

Application filed August 28, 1916. Serial No. 117,276.

*To all whom it may concern:*

Be it known that I, CYRUS MARSH, a citizen of the United States, residing at Ashland, in the county of Hanover and State of Virginia, have invented a new and useful Nutcracker, of which the following is a specification.

My invention relates to a new and improved nut-cracker, and is especially designed for cracking the shells of pecans; the objects of the invention are to provide a device for this purpose operating in the same manner as the ordinary well-known nut-cracker, but which is so constructed as to crack the shells of pecans at their thinnest, and, therefore, least resistant point, in such manner as will avoid breaking and bruising the meat or kernel by driving the broken shell therein.

With these and other objects in view, the invention consists in a nut-cracker of any desired design the jaws of which are provided with alining companion openings extending entirely therethrough and adapted to receive the ends of the nuts, especially pecans, and bite upon the shells of the same between their extremities and middle portions; and furthermore, in flaring said openings toward their outer ends, whereby to form clearances or discharges therefor.

Referring to the drawing—

Figure 1 is a side elevation of the conventional design of nut-cracker, the same embodying my invention;

Fig. 2 is a similar view, partly in section, of the jaw-end of the same; and

Fig. 3 is a view similar to Fig. 2 and illustrating a slight modification.

Similar numerals of reference indicate similar parts in all the figures of the drawing.

As before indicated, the nut-cracker may be of any desired design, and either of the hand-operated or bench variety, by which I mean it may be operated by hand, as for house-hold use, or secured to a bench or table, as where the nuts are to be cracked for the market or used in large quantities. As will be seen, therefore, the design of the device itself is changeable at will, and, as a matter of fact, forms no part of my invention—that shown being merely for the purpose of illustration.

In the present instance, 1, 1 designates the usual members, which are crossed and pivoted as at 2. In rear of their pivot, these members are, in the design shown, shaped to form suitable handles 3, 3, and at the opposite side of the pivot, to form the usual jaws 4, 4, which latter, may be of any shape preferred.

In each of the jaws 4, 4, there is formed an opening or orifice 5, the same extending entirely through the jaw and preferably being of circular shape in cross-section, though, as will be understood, said openings or orifices may be formed rectangular, polygonal, or any other shape in cross-section desired. I prefer, however, to make the openings or orifices circular, so as to approximate the shape of the pecan or other nut upon which they are designed to operate. These openings or orifices 5 are, furthermore, preferably flared toward their outer ends, so that they may be properly said to be cone-shaped, such being for the purpose of affording a clearance for the ends of the shells after the cracking operation.

If preferred, and as indicated in Fig. 2, the walls of the openings or orifices 5, may be formed with teeth 6, such teeth extending through the lengths of the openings, so that there will be produced at the inner operating ends of the openings or orifices, an annular series of angular spurs 7, that will tend to make the operation of cracking the nut much easier by requiring less exertion for this purpose.

As shown in Fig. 3, these teeth may be omitted, and the walls of the openings or orifices left plain and untoothed, but in any event there is produced at the inner end of each opening a continuous angular biting edge.

These openings or orifices 5, it will be understood, are of a diameter less than the greatest diameter of the nut (pecan) upon which they are intended to operate, so that, when the nut is in position in the cracker, the hard ends of the shell will be positioned and extend well within the openings of the jaws. As pressure is brought to bear upon the handles, or the jaws brought toward each other by any other means, the crushing force is only exerted upon the shell at a point between the biting edges of the jaws, and, consequently the shell of the nut will be fractured at its middle or thinnest part, the meat or kernel of the nut being uninjured and capable of being removed as a whole.

The hard ends of the nut that are usually cracked and driven into the meat or kernel of the nut, whereby the latter is injured and many times destroyed, remain uncracked, and readily pass from the cracker through the flared openings or orifices.

From the foregoing description in connection with the accompanying illustration, it will be seen that I have produced in a very simple manner a nut-cracker especially designed for operating upon the delicate as well as delicious pecan nut, and which, by means of its peculiar construction, is capable of cracking the shell so that it may be readily removed and the nut or kernel preserved as a whole, whereby it is more edible as well as salable.

I am perfectly aware that it is not novel in the art to provide the jaws of nut-crackers with cavities designed to receive the ends of nuts, but such will not accomplish the objects of my invention, in that in all such when a nut is operated upon by the pressure of the jaws, the hard ends receive pressure and are forced together and when the shell is fractured such ends are driven into the meat or kernel of the nut. Moreover, the ends of the shell are apt to get jammed in such cavities, causing the latter to rapidly fill up so as to render frequent cleaning necessary. By my shape of opening, however, the hard ends cannot accumulate, or should they do so, it would not matter, as they will be forced outward toward the larger ends of the openings and gradually be discharged therefrom.

Having described my invention, what I claim is:

1. A nut-cracker, the opposite jaws of which are provided with approximately circular companion openings extending entirely through the jaws and alining with each other and provided at their inner ends with biting edges.

2. A nut-cracker, the opposite jaws of which are provided with approximately circular companion openings extending entirely through the jaws and alining with each other, each of said openings being provided at its inner end with a biting edge having teeth.

3. A nut-cracker, the opposite jaws of which are provided with approximately circular companion openings extending entirely through the jaws and alining with each other, said openings being flared toward their outer ends and at their inner ends provided with a biting edge.

4. A nut-cracker, the opposite jaws of which are provided with approximately circular companion openings flared toward their outer ends and extending entirely through the jaws, each of said openings having a biting edge formed at its inner end, and teeth formed in said biting edge.

In testimony whereof I have signed my name to this specification in the presence of two subscribing witnesses.

CYRUS MARSH.

Witnesses:
  V. W. VAUGHAN,
  F. L. HUGHES.

Copies of this patent may be obtained for five cents each, by addressing the "Commissioner of Patents, Washington, D. C."